United States Patent
Hahm et al.

(10) Patent No.: US 9,361,860 B2
(45) Date of Patent: Jun. 7, 2016

(54) DISPLAY APPARATUS, IMAGE POST-PROCESSING APPARATUS AND METHOD FOR IMAGE POST-PROCESSING OF CONTENTS

(71) Applicant: SAMSUNG ELECTRONICS CO., LTD., Suwon-si (KR)

(72) Inventors: Cheul-hee Hahm, Seongnam-si (KR); Tae-young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 139 days.

(21) Appl. No.: 13/957,845

(22) Filed: Aug. 2, 2013

(65) Prior Publication Data

US 2014/0192068 A1 Jul. 10, 2014

(30) Foreign Application Priority Data

Aug. 2, 2012 (KR) .................. 10-2012-0084857
Jul. 5, 2013 (KR) .................. 10-2013-0079085

(51) Int. Cl.
*G06K 9/36* (2006.01)
*G09G 5/37* (2006.01)
*H04N 19/86* (2014.01)
*G09G 5/28* (2006.01)

(52) U.S. Cl.
CPC .............. *G09G 5/37* (2013.01); *H04N 19/86* (2014.11); *G09G 5/28* (2013.01)

(58) Field of Classification Search
None
See application file for complete search history.

(56) References Cited

U.S. PATENT DOCUMENTS

| | | | |
|---|---|---|---|
| 5,367,629 A * | 11/1994 | Chu et al. .............. | 382/253 |
| 6,362,816 B1 | 3/2002 | Kawanami et al. | |
| 6,708,217 B1 * | 3/2004 | Colson et al. ............ | 709/231 |
| 6,970,602 B1 * | 11/2005 | Smith et al. .............. | 382/232 |
| 7,031,552 B2 | 4/2006 | Kim | |
| 7,636,472 B2 | 12/2009 | Maruoka | |
| 2002/0030699 A1 * | 3/2002 | Van Ee ................... | 345/810 |
| 2003/0190086 A1 | 10/2003 | Kim | |

(Continued)

FOREIGN PATENT DOCUMENTS

| | | |
|---|---|---|
| JP | 2003339048 A | 11/2003 |
| JP | 2009-60205 A | 3/2009 |
| KR | 10-2005-0027029 A | 3/2005 |

OTHER PUBLICATIONS

Communication dated Nov. 20, 2013 issued by the European Patent Office in counterpart European Patent Application No. 13177031.5.

(Continued)

*Primary Examiner* — Li Liu
(74) *Attorney, Agent, or Firm* — Sughrue Mion, PLLC

(57) ABSTRACT

A display apparatus for post-processing the image of the contents, an image post-processor and a method for post-processing the image of the contents are disclosed. The display apparatus includes a communicator which communicates with a server, a display which displays contents received from the server, and a controller which determines an image post-processing method for elements of the contents based on source information of the contents and predetermined condition information, renders the elements which are post-processed according to the determined image post-processing method, and controls the display to display the contents generated after the rendering. Accordingly, the display apparatus can selectively implement image post-processing for the elements of the contents.

23 Claims, 5 Drawing Sheets

(56) References Cited

U.S. PATENT DOCUMENTS

| | | |
|---|---|---|
| 2003/0195998 A1 | 10/2003 | Estrop |
| 2004/0100489 A1* | 5/2004 | Berestov et al. .............. 345/738 |
| 2005/0058341 A1 | 3/2005 | Maruoka |
| 2005/0184993 A1* | 8/2005 | Ludwin et al. ................ 345/502 |
| 2010/0070613 A1* | 3/2010 | Chen et al. .................... 709/219 |
| 2010/0265334 A1 | 10/2010 | Bhaskaran et al. |
| 2011/0221960 A1* | 9/2011 | Glaznev et al. .............. 348/515 |
| 2011/0255777 A1 | 10/2011 | Matsuoka |
| 2011/0302603 A1* | 12/2011 | Sugai ............................. 725/38 |
| 2012/0054616 A1 | 3/2012 | Mittal |
| 2012/0162525 A1 | 6/2012 | Schoner et al. |
| 2012/0170669 A1 | 7/2012 | Park et al. |
| 2012/0238363 A1* | 9/2012 | Watanabe et al. ............... 463/31 |
| 2013/0204967 A1* | 8/2013 | Seo et al. ...................... 709/217 |
| 2013/0275899 A1* | 10/2013 | Schubert et al. .............. 715/765 |

OTHER PUBLICATIONS

International Search Report (PCT/ISA/210) dated Nov. 22, 2013 from the International Searching Authority in counterpart Application No. PCT/KR2013/006310.

Written Opinion (PCT/ISA/237) dated Nov. 22, 2013 from the International Searching Authority in counterpart Application No. PCT/KR2013/006310.

* cited by examiner

DISPLAY APPARATUS, IMAGE POST-PROCESSING APPARATUS AND METHOD FOR IMAGE POST-PROCESSING OF CONTENTS

CROSS-REFERENCE TO RELATED APPLICATIONS

This application claims priority from Korean Patent Application No. 10-2012-0084857, filed on Aug. 2, 2012, in the Korean Intellectual Property Office, and Korean Patent Application No. 10-2013-0079085, filed on Jul. 5, 2013, in the Korean Intellectual Property Office, the disclosures of which are incorporated herein by reference in their entireties.

BACKGROUND

1. Field of the Invention

Apparatuses and methods consistent with exemplary embodiments relate to a display apparatus, an image post-processing apparatus and a method thereof, and more specifically, to a display apparatus to post-process the contents, to an image post-processor, and to an image post-processing method thereof.

2. Description of the Related Art

The display apparatuses in a related art such as the smart TVs perform the rendering of the elements of the contents based on the source information of the contents received from the web server, and display the rendered contents on the screen. The elements of the contents are members or parts that form the contents. For example, element of contents is usually any one of a Graphics Interchange Format (GIF) image, a graphic rendering, a text, a JPEG image, a flash animation, and a video image.

Because the elements such as GIF image, JPEG image, flash animation and video image have large data volume, these elements are compressed before being transmitted to a display apparatus for the purpose of efficient data transmission. Thus, the display apparatus restores the image of the compressed elements of the contents to display the contents which include the elements. However, while restoring the image, problems such as blocking artifact or ringing artifact may happen.

To solve this problem, the display apparatus, in a related art, post-processes the image of the generated contents unilaterally after rendering the elements to generate the contents.

If the related-art post-processing method is applied, the artifact may decrease regarding the elements such as the JPEG image. However, the elements such as the text have a degraded readability and a degraded definition.

Thus, a new method of selectively post-processing the elements of the contents is requested.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to one exemplary embodiment, an image post-processing is selectively applied to elements of contents in a display apparatus.

A display apparatus according to an exemplary embodiment includes a communicator which communicates with a server to receive contents from the server and a controller which determines an image post-processing method for elements of the contents based on source information of the contents and predetermined condition, renders the elements which are post-processed according to the determined image post-processing method, and controls to generate the post-processed contents for a display after the rendering, and at least one element of the contents is post-processed differently from at least one other element of the contents based on the source information.

The display apparatus may further include a display which displays the generated contents, an image post-processor which performs image post-processing, and a storage which stores condition information to distinguish elements to be post-processed from among elements of the contents, and the controller may classify the elements of the contents into at least two groups based on the source information of the contents and condition information stored in the storage, and control the image post-processor to post-process elements of only one of the at least two groups.

The controller may classify the elements of the contents into a first group including elements to be post-processed and a second group including remaining elements based on the source information of the contents and the predetermined condition information stored in the storage and control the image post-processor to post-process only the first group, and the first group may include elements related to video image, and the second group comprises at least one of graphic rendering and text.

The elements related to video image may be at least one of Graphics Interchange Format (GIF) image, JPEG image, flash animation, and moving image.

The display apparatus may further include a storage which stores an image post-processing method corresponding to each element of the contents, and the storage may further store an image post-processing method corresponding to the elements to be post-processed, and the controller may determine the image post-processing method for each element of the contents which are classified as elements to be post-processed based on the image post-processing method stored on the storage.

The controller may determine an image post-processing method for elements including GIF image and JPEG image differently from an image post-processing method for elements including flash animation and moving image based on the image post-processing method stored in the storage.

The image post-processing method may include at least one of a detail enhancement, a color enhancement, a noise reduction, a blocking artifact reduction, a ringing artifact reduction, a definition enhancement, a video deinterlacing, and a frame rate conversion.

The server may be a web server, and the contents may be a web page contents received from the web server.

An image post-processing apparatus according to an exemplary embodiment includes a storage which stores condition information to distinguish elements to be post-processed from among elements of the contents, a group classifier which classifies elements of the contents into at least two groups based on source information of the contents and condition information stored in the storage, an image post-processor which post-processes an image corresponding to at least some of the elements of the contents, and a controller which determines an image post-processing method for each element of one of the at least two classified groups, and controls the image post-processor to post-process the image of each element according to the determined image post-processing method.

The group classifier may classify elements to be post-processed as a first group and remaining elements as a second group based on source information of the contents and condition information stored in the storage, and the controller may control the image post-processor to post-process only the elements of the first group.

A method of displaying contents according to an exemplary embodiment includes determining an image post-processing method for elements of the contents based on source information of the contents received from a server and predetermined condition information, post-processing the elements of the contents according to the determined image post-processing method, and rendering the post-processed elements to generate the post-processed contents for a display, wherein at least one element of the contents is post-processed differently from at least one other element of the contents based on the source information.

The method may further include displaying the generated contents, and the predetermined condition information may be information to distinguish elements to be post-processed from among elements of the contents, and the determining may include classifying the elements of the contents into at least two groups based on the source information of the contents and the predetermined condition information, and determining the image post-processing method to post-process elements of only one of the at least two groups.

The determining may include classifying elements of the contents into a first group including elements to be post-processed and a second group including remaining elements based on the source information of the contents and the predetermined condition information, and the first group may include elements related to video image, and the second group may include at least one of graphic rendering and text.

The elements related to video image may be at least one of Graphics Interchange Format (GIF) image, JPEG image, flash animation, and moving image.

The determining may include determining an image post-processing method for each element in a group including elements to be post-processed based on previously stored image post-processing methods corresponding to respective elements of the contents.

The determining may include determining an image post-processing method for elements including GIF image and JPEG image differently from an image post-processing method for elements including flash animation and moving image based on the image post-processing method stored in the storage.

The image post-processing method may include at least one of a detail enhancement, a color enhancement, a noise reduction, a blocking artifact reduction, a ringing artifact reduction, a definition enhancement, a video deinterlacing, and a frame rate conversion.

The server may be a web server, and the contents may be a web page contents received from the web server.

A method of performing image post-processing according to an exemplary embodiment includes classifying elements of contents into at least two groups based on source information of the contents and condition information to distinguish elements to be post-processed from among elements of the contents, determining an image post-processing method for each element of at least one of the two groups, and performing image post-processing of an image corresponding to a respective element of the contents according to the determined image post-processing method.

The classifying may include classifying elements of the contents into a first group including elements to be post-processed and a second group including remaining elements based on the source information of the contents and the pre-stored condition information, and the performing the image post-processing may include post-processing only the elements of the first group.

Each element of the contents may represent an image or text displayed to be displayed.

A first element may include at least one of an image or a video generated by the server and a second element may include text or graphic rendering generated by the display apparatus, and the first element may be post-processed differently from the second element.

Accordingly, the display apparatus can selectively implement image post-processing for the elements of the contents.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
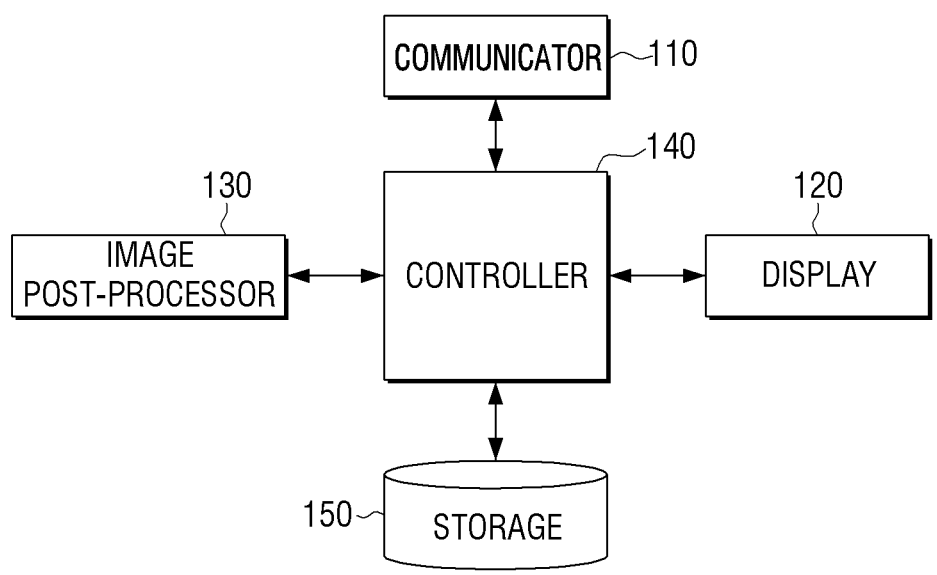
FIG. 1 is a block diagram illustrating a display apparatus according to an exemplary embodiment.

Certain exemplary embodiments will now be described in greater detail with reference to the accompanying drawings.

In the following description, same drawing reference numerals are used for analogous elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

FIG. 1 is a block diagram illustrating a display apparatus according to an exemplary embodiment.

Referring to FIG. 1, the display apparatus may include a communicator 110, a display 120, an image post-processor 130, a controller 140, and optionally, storage 150.

The communicator 110 may communicate with a content-providing server, and the display 120 may display the contents received from the server via the communicator 110 on the screen. Specifically, the communicator 110 may include various communication modules such as a short distance wireless communication module (not illustrated) or a wireless communication module (not illustrated). The short distance wireless communication module (not illustrated) may include, for instance, the Bluetooth or the ZigBee, and the wireless communication module (not illustrated) may include the WiFi or the IEEE connected to an external network to communicate according to the wireless communication protocol. However, an exemplary embodiment is not limited to the above specific examples, and accordingly, the wireless communication module (not illustrated) may include any mobile communication module that connects to the mobile communication network according to various mobile communication protocols such as the 3rd Generation (3G), the 3rd Generation Partnership Project (3GPP), or the Long Term Evolution (LTE).

If the contents are received from the server through the communicator 110, as described above, the display 120 may display the received contents. However, an exemplary embodiment is not limited to the specific example, and accordingly, the display 120 may receive the contents from the server through a receiver (not illustrated) such as a network interface card, or from an external device such as a CD, a DVD, a hard disk, a blu ray disk, a memory card, or a USB memory. The content-providing server may preferably be a web server which provides web page contents.

The image post-processor 130 may post-process the image regarding the elements of the contents received from the server under the control of the controller 140. The elements of the contents may be at least one of a Graphics Interchange Format (GIF) image, a graphic rendering, a text, a JPEG image, a flash animation or a video image.

The controller 140 may determine a method to post-process the image of the elements of the contents based on the source information and predetermined conditions received from the server, and control the image post-processor 130 to perform post-processing by the determined image post-processing method. The controller 140 may generate the contents by rendering the post-processed elements at the image post-processor 130 and control the display 120 to display the generated contents.

The "image post-processing method" as used herein may refer to a processing method to remove artifacts which occur in the process of decoding for displaying elements where compression is applied, such as images like JPEG, MPGE from among elements of the contents received from the server, or to improve screen quality.

The image post-processing method may be at least one of detail enhancement, color enhancement, noise reduction, blocking artifact reduction, ringing artifact reduction, definition enhancement, video deinterlacing, and frame rate conversion. Since the exemplary image post-processing methods mentioned above are known in the art, they will not be explained in greater detail for the sake of brevity.

Meanwhile, according to an exemplary embodiment, the content-providing server may be a web server, and the contents received from the web server may be web page contents. Thus, the web page contents may include source information regarding at least one of GIF image, graphic rendering, text, JPEG image, flash animation and video image. However, an exemplary embodiment is not limited to the specific example mentioned above, and accordingly, as explained above, the contents including the source information of at least one element may be received from the external device such as a recording medium device.

Accordingly, the controller 140 may find the elements of the contents based on the source information of the received contents. If the elements of the contents are found, the image post-processing method corresponding to the respective elements may be determined from among the above image post-processing methods. Specifically, the controller 140 may classify the elements of the contents into at least two groups based on the source information of the received contents and predetermined condition information. The controller 140 may control the image post-processor 130 to perform the image post-processing regarding only the elements of one of the two or more classified groups.

More specifically, the controller 140 may classify the elements of the contents into the first group and the second group including the elements where the image post-processing is to be applied and the remaining elements, respectively based on the source information of the received contents and the condition information pre-stored in the storage 150. Herein, the first group may include elements related to video images from among elements of the contents, and the second group may include at least one element out of graphic rendering and a text.

Accordingly, the image post-processor 130 may perform post-processing with respect to the elements related to video images which belong to the first group. Meanwhile, the elements related to video images which belong to the first group may be at least one element from among Graphics Interchange Format (GIF) image, JPEG image, flash animation, and moving image. Meanwhile, the condition information pre-stored in the storage 150 may be information to distinguish elements which are subject to post-processing from among elements constituting the contents. As described above, the elements constituting the contents may include GIF image, JPEG image, flash animation, moving image, graphic rendering, and text, and with respect to the elements including GIF image, JPEG image, flash animation, and moving image, condition information for performing post-processing may be stored in the storage 150.

Out of the above-described elements, GIF image, JPEG image, flash animation, and moving image are compressed and transmitted using a compression method in order to reduce the volume of data transmission.

Accordingly, once elements constituting the corresponding contents are analyzed from source information of the received contents, the controller 140 divide the elements constituting the received contents into the elements subject to image post-processing and the remaining elements based on the condition information stored in the storage 150. Herein, the remaining elements may be elements for which image post-processing is not performed. As the elements for which image post-processing is to be performed are separated from other elements constituting the contents, the controller 140 may classify the elements subject to image post-processing as the first group and the remaining elements as the second group.

Accordingly, the display apparatus may restore the image of the elements such as the video image and the JPEG image compressed and transmitted from the server. However, if the image is restored and displayed, the video image or the JPEG image may have the blocking or the ringing artifact. To remove the blocking or the ringing artifact, the image post-processing method such as the blocking artifact reduction and/or the ringing artifact reduction is applied.

Meanwhile, among the elements of the contents, the elements such as the text and the graphic image are generated at the display apparatus based on the information received from the server. That is, the elements such as the text and the graphic image are not the images which are received from the server through a separate compression and conversion operation, it is not necessary to restore the image of the element such as the video image and the JPEG image. Accordingly, the element such as the text and the graphic image may not require the image post-processing method to remove the artifacts occurred in the elements such as the video image and the JPEG image.

For the above reason, the condition information to distinguish elements which require image post-processing from other elements from among elements constituting the contents may be stored in the storage 150.

Accordingly, once elements constituting the corresponding contents are analyzed from source information of the received contents, the controller 140 divide the elements constituting the received contents into the elements subject to image post-processing and the remaining elements based on the condition information stored in the storage 150. Herein, the remaining elements may be elements for which image post-processing is not performed. As the elements for which image post-processing is to be performed are separated from other elements constituting the contents, the controller 140 may classify the elements subject to image post-processing as the first group and the remaining elements as the second group Post-processing methods, if any, may depend on an element type, i.e., on the type of contents such that different post-processing is applied to different types of contents.

Once the elements are divided into the first group including elements which are subject to image post-processing and the second group including elements which are not subject to image post-processing, the image post-processor 130 may perform the image post-processing only regarding the elements of the first group, without performing the image post-processing regarding the second group.

Meanwhile, the storage 150 may further store an image post-processing method corresponding to the elements which require image post-processing.

Accordingly, the controller 140 may determine an image post-processing method corresponding to the elements included in the first group based on the image post-processing method stored in the storage 150, and the image post-processor 130 may perform image post-processing differently with respect to the elements included in the first group based on the determined image post-processing method.

As described above in an exemplary embodiment, the video image and the JPEG image may have the blocking or the ringing artifact. The "blocking artifacts" as used in an exemplary embodiment refers to blocking phenomenon which is the brightness discontinuity at the respective boundaries of the blocks in the process of decoding the image data compressed by the block-based image compressing method such as JPEG. The "ringing artifacts" as used in an exemplary embodiment refers to an oscillatory ripple pattern usually in the form of white shadow generated around edges of an image pattern, generating stepwise variations on an image played on the display apparatus such as TV.

Thus, regarding the video image, in the case of flash animation or moving image, the image post-processing method such as the blocking artifact reduction and the frame rate conversion may be matched and stored in the storage 150. Regarding the JPEG image, in the case of GIF image or JEPG image, the image post-processing method such as the blocking artifact reduction and the ringing artifact reduction may be matched and stored in the storage 150. Thus, the image post-processing method suitable for each element of the contents may be matched and stored in the storage 150. Based on the image post-processing method stored in the storage 150, the controller 140 may determine the image post-processing method for each element of the contents.

Accordingly, the image prost-processor 130 devoted to post-processing the elements included in the first group may perform image post-processing differently with respect to the elements of the first group based on the image post-processing method determined by the controller 140. However, an exemplary embodiment is not limited to the specific example, and accordingly, the image post-processor 130 may post-process all elements of the contents. As described above, the image post-processing method corresponding to each element of the contents may be stored in the storage 150. According to the image post-processing method stored in the storage 150, the controller 140 may determine the image post-processing method for each element of the received contents so that the image post-processor 130 performs image post-processing on each element of the first and second groups according to the image post-processing method as determined by the controller 140.

If each element of the contents received from the server post-processed by the image post-processor 130, the controller 140 may perform the rendering of the post-processed image of the elements and generate the contents. Thus, the display 120 may display the contents of the post-processed image regarding the elements on the screen.

Figure 2:
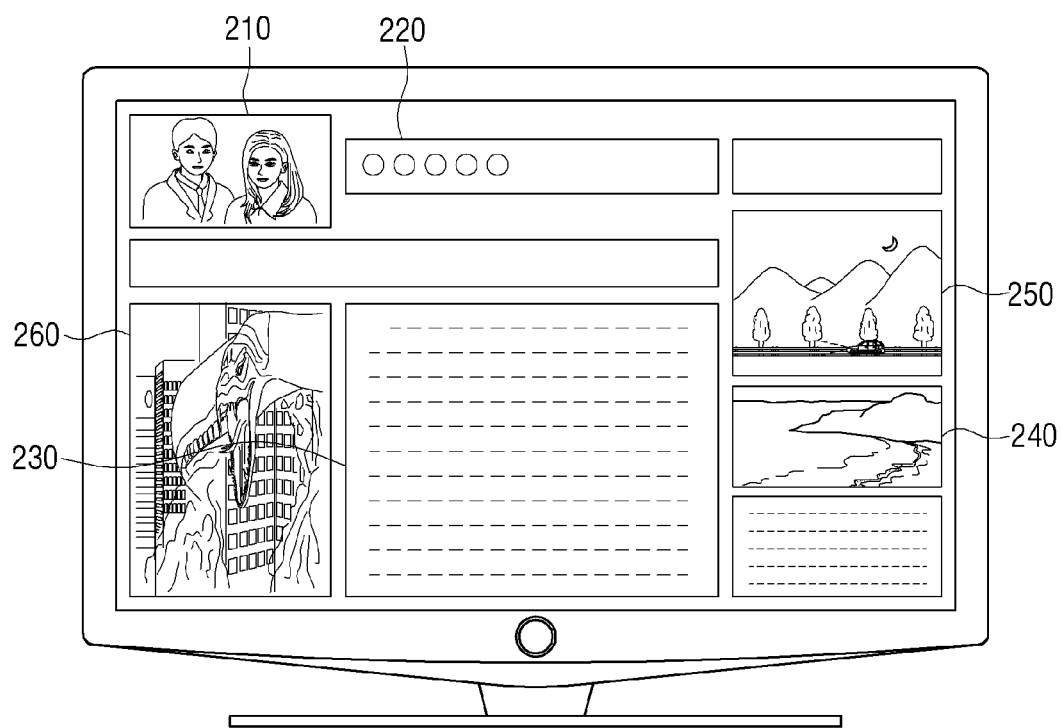
FIG. 2 is a view illustrating a display apparatus displaying a web page contents according to an exemplary embodiment.

For instance, referring to FIG. 2, if the web page contents such as a portal site are received from the web server, the display apparatus may post-process the image regarding the elements of the web page contents in the portal site, and display the post-processed web page contents.

FIG. 2 is a view illustrating a display apparatus displaying web page contents according to an exemplary embodiment.

Referring to FIG. 2, if the web page contents are received from the server providing the web page contents such as the web server, the controller 140 may find the elements of the web page contents based on the source information of the received web page contents. An exemplary embodiment illustrated in FIG. 2 includes the elements of the web page contents which are: a GIF image 210, a graphic rendering 220, a text 230, a JPEG image 240, a flash animation 250, and a video image 260.

If the elements of the web page contents are found, the controller 140 may determine the image post-processing method regarding each element separately. According to an exemplary embodiment, the controller 140 may classify GIF image 210, JPEG image 240, flash animation 250, and moving image 260 from among elements constituting web page contents as the first group, and graphic rendering 220 and text 230 as the second group. If the elements are classified into the two groups as explained above, the image post-processor 130 may exclusively post-process the image regarding the elements included in the first group. That is, post processing may be applied only to the elements in the first group and not the elements in the second group. The storage 150 may store the image post-processing method corresponding to the elements generated in the server. Thus, the image post-processor 130 may perform image post-processing differently with respect to the elements of the first group according to the image post-processing method stored in the storage 150.

Depending on the exemplary embodiments, the image processor 130 may perform image post-processing by applying an image post-processing method regarding detail enhancement, color enhancement and noise reduction with respect to the GIF image 210 and the JPEG image 240. In addition, the image processor 130 performs image post-processing by applying an image post-processing method regarding video deinterlacing and frame rate conversion along with the image post-processing method regarding detail enhancement, color enhancement and noise reduction with respect to the flash animation 250 and the moving image 260.

If the image of the elements included in the first group is post-processed by the image post-processor 130, the controller 140 may generate the web page contents received from the server by performing rendering the post-processed elements of the first group and the non-post-processed elements of the second group which are not post-processed. The display 120 may display the web page contents including the post-processed elements and the non-post-processed elements.

According to another exemplary embodiment, the storage 150 may store the image post-processing method corresponding to the entire elements of the contents. Thus, if the elements of the web page contents are found by the controller 140, the image post-processor 130 may post-process the image of the elements of the web page contents according to the corresponding image post-processing methods stored in the storage 150.

If the image post-processing is performed on the elements of the web page contents by the image post-processor 130, the controller 140 may perform rendering of the respective post-processed elements and may generate the web page contents. The display 120 may display the generated web page contents including the post-processed elements.

Referring to an exemplary constitution of the display apparatus which performs post-processing of an image of each element of the contents, which renders the post-processed elements to generate contents and which displays the generated contents, according to an exemplary embodiment, is explained above. Hereinbelow, the constitution of the image post-processor to post-process the image of the contents according to an exemplary embodiment will be described in detail.

Figure 3:
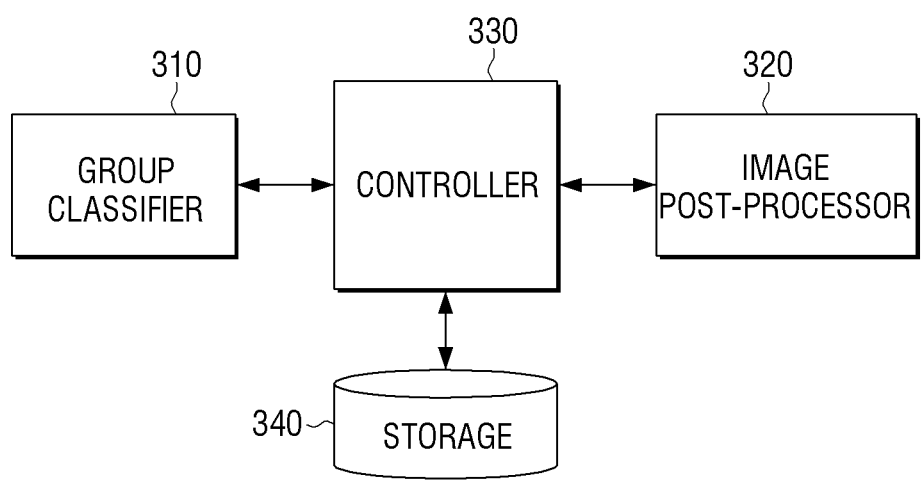
FIG. 3 is a block diagram illustrating an image post-processing apparatus according to an exemplary embodiment.

FIG. 3 is a block diagram illustrating an image post-processor according to an exemplary embodiment.

Referring to FIG. 3, the image post-processor may include a group classifier 310, an image post-processor 320, a controller 330, and a storage 150.

The group classifier 310 may classify the elements of the contents into at least two groups based on the source information of the contents and condition information pre-stored in the storage 340. The image post-processor 320 may post-process at least one of the two groups.

Herein, the condition information stored in the storage 340 may be information to distinguish elements which require image post-processing from among elements constituting the contents.

The elements of the contents may be at least one of the GIF image, the graphic rendering, the text, the JPEG image, the flash animation and the video image.

Out of the above-described elements, the GIF image, the JPEG image, the flash animation, and the moving image are compressed and transmitted using a compression method in order to reduce the volume of data transmission. Accordingly, when the video image which has been compressed and transmitted using such a compression method is restored, distortion such as blocking artifacts or ringing artifacts may occur.

Accordingly, condition information to distinguish elements which require image post-processing due to such distortion from elements which do not require image post-processing from among elements constituting the contents may be stored in the storage 340.

Accordingly, once elements constituting the corresponding contents are determined based on source information of the received contents, the group classifier 310 may divide the elements into the first group including elements which are subject image post-processing and the second group including the remaining elements based on the condition information stored in the storage 340.

If the elements are classified into the first and second groups, the controller 330 may control the image post-processor 320 to determine an image post-processing method with respect to each of the elements of the first group based on an image post-processing method for each element pre-stored in the storage 340 and perform image post-processing with respect to the elements of the first group according to the determined image post-processing method. Accordingly, the image post-processor 320 may exclusively post-process the elements in the first group based on the image post-processing method for each element included in the first group. An alternative exemplary embodiment may provide different types of post-processing for elements in the first group and elements in the second group.

Specifically, the storage 340 may store an image post-processing method to be applied for each element for image post-processing along with the condition information to distinguish the elements which require image post-processing from other elements constituting the contents.

The image post-processing method may be at least one of the detail enhancement, the color enhancement, the noise reduction, the blocking artifact reduction, the ringing artifact reduction, the definition enhancement, the video deinterlacing and the frame rate conversion. At least one of the image post-processing method may be matched with the elements in the first group and stored in the storage (not illustrated).

Accordingly, at least one of the image post-processing methods and an element where the corresponding image post-processing method is to be applied may be matched with each other and stored in the storage 340, and the controller 330 may determine an image post-processing method for each element in the first group based on the image post-processing method for each element pre-stored in the storage 340.

Once the image post-processing method for each element of the first group is determined, the image post-processor 320 may perform image post-processing with respect to the elements of the first group based on the determined image post-processing method for each element of the first group.

Thus, the display apparatus such as the smart phone or the smart TV may perform rendering of the elements which are post-processed differently by the image post-processor, and display the resultant contents on the screen.

By referring to the elements of the image post-processor according to an exemplary embodiment, the operation of post-processing the image regarding the elements of the contents is explained in detail above. Hereinbelow, an exemplary method of displaying the post-processed image of the contents in the display apparatus and a method of post-processing the image regarding the elements of the contents in the image post-processor according to an exemplary embodiment will be explained.

Figure 4:
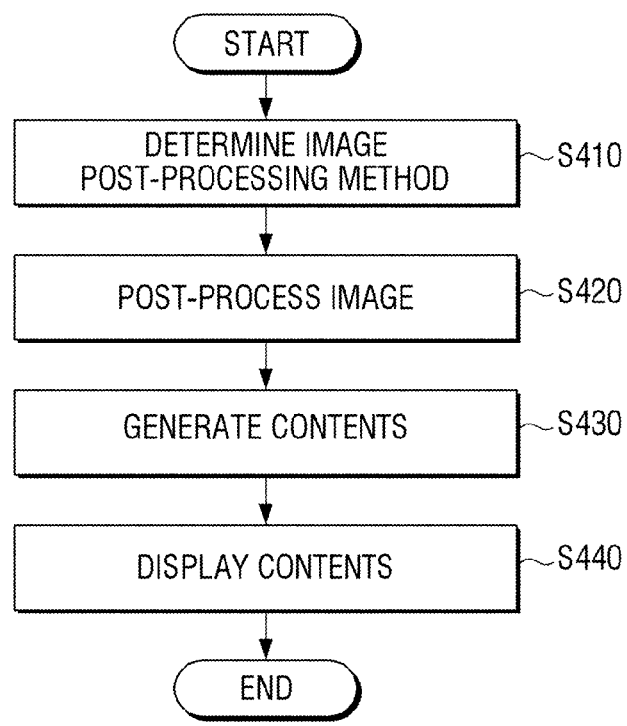
FIG. 4 is a flowchart illustrating a method of displaying post-processed contents in a display apparatus according to an exemplary embodiment.

FIG. 4 is a flowchart illustrating a method of displaying the post-processed contents in the display apparatus according to an exemplary embodiment.

As illustrated in FIG. 4, when the contents are received from the server, the display apparatus may determine an image post-processing method with respect to the elements of the contents based on the source information of the received contents and predetermined condition information (S410). At operation S420, if the methods to post-process the elements of the contents are determined, the display apparatus may perform the post-processing of the elements of the contents according to the determined image post-processing method. At operations S430 and S440, the display apparatus may render the post-processed elements to generate the contents and display the contents on the screen.

Specifically, the display apparatus identifies elements constituting the contents based on the source information of the contents. The elements constituting the contents may be at least one of GIF image, graphic rendering, text, JPEG image, flash animation, and moving image. The server which provides the contents including the above elements may be a web server, and the contents received from a web server may be web page contents. However, the present invention is not limited thereto, and the contents may be contents which are received from an external apparatus such as a recording medium apparatus or a broadcast server providing broadcast contents. In other words, the contents of the exemplary embodiment may be contents including source information regarding each element mentioned above.

Once the elements constituting the corresponding contents are identified based on the source information of the contents, the display apparatus classifies the elements constituting the corresponding contents into two groups based on predetermined condition information. Subsequently, the display apparatus determines an image post-processing method to perform image post-processing for elements included in at least one of the two groups.

Herein, the condition information may be information to distinguish elements which require image post-processing from among elements constituting the corresponding contents. As described above, the elements regarding GIF image, JPEG image, flash animation, and moving image from among elements constituting the contents are compressed and transmitted using a compression method in order to reduce the volume of data transmission. Accordingly, when the video image which has been compressed and transmitted using such a compression method is restored, distortion such as blocking artifacts or ringing artifacts may occur. Accordingly, condition information to distinguish elements which require image post-processing due to such distortion from elements which do not require image post-processing from among elements constituting the contents may be set and stored.

Accordingly, the display apparatus classifies elements constituting the contents into the first group including elements which are subject to image post-processing and the second group including the remaining elements based on the predetermined condition information. That is, the display apparatus may classify elements related to video images from among elements constituting the contents as the first group and the remaining elements as the second group.

As described above, the elements of the contents may be the GIF image, the graphic rendering, the text, the JPEG image, the flash animation, and the video image.

Accordingly, the elements classified as the first group may be at least one of GIF image, JPEG image, flash animation, and moving image, and the elements classified as the second group may be at least one of graphic rendering and text.

If the elements of the contents are classified, the display apparatus may determine only the image post-processing method to post-process the image of the elements included in the first group.

Herein, the image post-processing method refers to a processing method to remove artifacts which occur in the process of decoding for displaying elements where compression is applied, such as images like JPEG, MPGE from among elements of the contents received from the server, or to improve screen quality. The image post-processing method may include at least one of a detail enhancement, a color enhancement, a noise reduction, a blocking artifact reduction, a ringing artifact reduction, a definition enhancement, a video deinterlacing, and a frame rate conversion. Such image post-processing methods are known technologies, so further description thereof will not be provided.

Specifically, the display apparatus may previously store the image post-processing methods corresponding to the elements of the GIF image, the JPEG image, the flash animation and the video image. Thus, the display apparatus may post-process the image of the elements classified as the first group differently according to the previously stored image post-processing method. The display apparatus may perform the rendering of the elements of the non-post-processed second group and the post-processed elements of the first group. Thus, the display apparatus may display the contents including the post-processed elements and the non-post-processed elements.

According to another exemplary embodiment, the display apparatus may determine the image post-processing method for each element of the contents received from the server. Specifically, the display apparatus may previously store the image post-processing method corresponding to every element of the contents. Thus, if the elements of the contents are found based on the image source of the contents received from the server, the display apparatus may determine the image post-processing methods corresponding to the elements of the contents based on the previously stored image post-processing methods in each element. The display apparatus may post-process the image regarding the elements of the contents according to the determined image post-processing method. After post-processing the image, the display apparatus may perform the rendering of every post-processed element. Thus, the display apparatus may display the contents including every post-processed element on the screen.

The method of displaying the post-processed contents on the display apparatus according to an exemplary embodiment is described above. An exemplary method of post-processing the elements of the contents at the image post-processor is explained in detail below.

Figure 5:
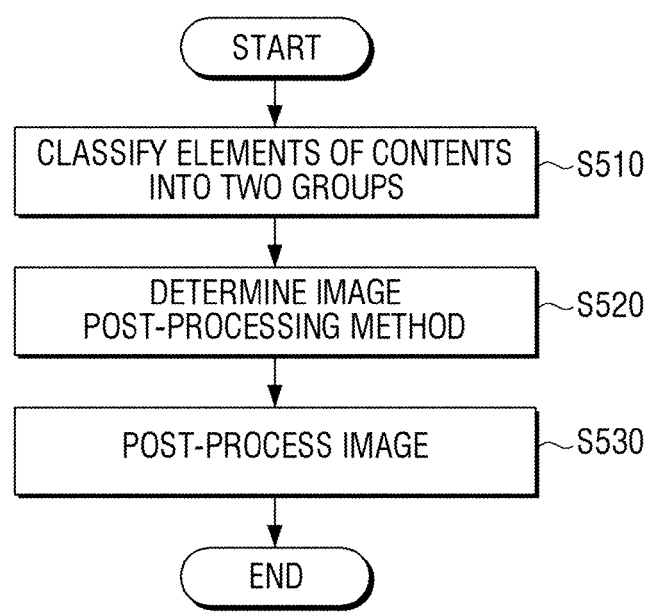
FIG. 5 is a flowchart illustrating a method of post-processing the elements of the contents in an image post-processing apparatus according to an exemplary embodiment.

FIG. 5 is a flowchart illustrating a method of post-processing the image regarding the elements of the contents at the image post-processing apparatus according to an exemplary embodiment.

As illustrated in FIG. 5, when the contents are received externally, the image post-processor classify the elements of the contents into at least two groups based on the source information of the received contents and predetermined condition information to distinguish elements which require image post-processing from other elements (S510).

Subsequently, the image post-processor may determine the image post-processing method to perform the image post-processing of each element of one group from among at least two groups as classified (S520). At operation S530, the image post-processor may perform the post-processing of each element of one group according to the determined image post-processing method.

Specifically, the elements of the contents may be at least one of the GIF image, the graphic rendering, the text, the JPEG image, the flash animation and the video image.

Out of the above-described elements, GIF image, JPEG image, flash animation, and moving image are compressed and transmitted using a compression method in order to reduce the volume of data transmission. Accordingly, when the video image which has been compressed and transmitted using such a compression method is restored, distortion such as blocking artifacts or ringing artifacts may occur. Accordingly, condition information to distinguish elements which require image post-processing due to such distortion from elements which do not require image post-processing from among elements constituting the contents may be set.

Accordingly, once elements constituting the corresponding contents are determined based on source information of the received contents, the image post-processor may divide the elements into the first group including elements which are subject image post-processing and the second group including the remaining elements based on the predetermined condition information.

That is, the image post-processor may classify the GIF image, the JPEG image, the flash animation and the video image as the first group and classify the graphic rendering and the text as the second group. If the first and second groups are classified, the image post-processor may determine the image post-processing method to post-process the image of each element of the first group based on the predetermined image post-processing method for each element. The image post-processing method may be at least one of the detail enhancement, the color enhancement, the noise reduction, the blocking artifact reduction, the ringing artifact reduction, the definition enhancement, the video deinterlacing and the frame rate conversion. At least one of the image post-processing methods may be matched with the constituent in the first group and previously stored in the image post-processor. Thus, according to the image post-processing method regarding the previously stored elements, the image post-processor may determine the image post-processing method to be applied to the elements of the first group and perform the image post-processing of the elements in the first group according to the determined image post-processing method.

However, an exemplary embodiment is not limited to the specific example only, and accordingly, the image post-processor may previously store the image post-processing method for every element of the contents. The image post-processor may perform the image post-processing regarding the elements included in the first and second groups according to the previously stored image post-processing method in each element.

Thus, the display apparatus such as the smart phone or the smart TV may perform the rendering of the elements which are post-processed differently by the image post-processor, and display the contents on the screen. In other words, in an exemplary embodiment, a picture such as a web page displayed on a screen may be made up of a number of elements which form the displayed contents. Accordingly, in an exemplary embodiment, these elements may be individually, differently post-processed based on individual attributes of the respective element. In an exemplary embodiment, the elements may also be split into a number of groups such that each group has its own respective post processing. It is possible that post-processing may be omitted for some individual members/elements of contents and/or for some groups.

The foregoing exemplary embodiments and advantages are merely exemplary and are not to be construed as limiting. The present disclosure can be readily applied to other types of apparatuses. Also, the description of the exemplary embodiments is intended to be illustrative, and not to limit the scope of the claims, and many alternatives, modifications, and variations will be apparent to those skilled in the art. The scope is defined not by the detailed description of exemplary embodiments but by the appended claims, and their equivalents and all differences within the scope will be construed as being included in an inventive concept.

What is claimed is:

1. A display apparatus, comprising:
   a communicator which communicates with a server to receive contents from the server; and
   a controller which is configured to decode the contents, determine an image post-processing method for elements of the decoded contents based on source information of the contents and predetermined condition, render the elements which are post-processed according to the determined image post-processing method, and control to generate the post-processed contents for a display after the rendering,
   wherein at least one element of the contents is post-processed differently from at least one other element of the contents based on the source information,
   wherein the image post processing method removes defects which occur in the decoding of the contents and is selectively applied to the elements of the contents such that the image post processing method is omitted for at least one element of the elements of the contents based on the source information of the contents and the predetermined condition, and
   wherein the image post processing method is selected from among detail enhancement, color enhancement, noise reduction, blocking artifact reduction, ringing artifact reduction, definition enhancement, video deinterlacing, and frame rate conversion.

2. The display apparatus of claim 1, further comprising:
   a display which displays the generated contents;
   an image post-processor which performs image post-processing; and
   a storage which stores condition information to distinguish elements to be post-processed from among elements of the contents,
   wherein the controller classifies the elements of the contents into at least two groups based on the source information of the contents and condition information stored in the storage, and controls the image post-processor to post-process elements of only one of the at least two groups.

3. The display apparatus of claim 2, wherein the controller classifies the elements of the contents into a first group including elements to be post-processed and a second group including remaining elements based on the source information of the contents and the predetermined condition information stored in the storage, and control the image post-processor to post-process only the first group,
   wherein the first group comprises elements related to video image, and the second group comprises at least one of graphic rendering and text.

4. The display apparatus of claim 3, wherein the elements related to video image is at least one of Graphics Interchange Format (GIF) image, JPEG image, flash animation, and moving image.

5. The display apparatus of claim 3, further comprising:
   a storage which stores an image post-processing method corresponding to each element of the contents,
   wherein the storage further stores an image post-processing method corresponding to the elements to be post-processed,
   wherein the controller determines the image post-processing method for each element of the contents which are classified as elements to be post-processed based on the image post-processing method stored on the storage.

6. The display apparatus of claim 5,
   wherein the controller determines an image post-processing method for elements including GIF image and JPEG image differently from an image post-processing method for elements including flash animation and moving image based on the image post-processing method stored in the storage.

7. The display apparatus of claim 5, wherein the image post-processing method comprises at least one of a detail enhancement, a color enhancement, a noise reduction, a blocking artifact reduction, a ringing artifact reduction, a definition enhancement, a video deinterlacing, and a frame rate conversion.

8. The display apparatus of claim 1, wherein the server is a web server, and the contents is a web page contents received from the web server.

9. An image post-processing apparatus comprising:
a storage which stores condition information to distinguish elements to be post-processed from among elements of the contents;
a group classifier which classifies elements of the contents into at least two groups based on source information of the contents and condition information stored in the storage;
an image post-processor which post-processes an image corresponding to at least some of the elements of the contents after decoding of the contents; and
a controller which determines an image post-processing method for each element of one of the at least two classified groups, and controls the image post-processor to post-process the image of each element according to the determined image post-processing method
wherein the image post processing method, determined by the controller, removes defects which occur in the decoding and is selectively applied to the elements of the contents such that the image post processing method is omitted for at least one element of the elements of the contents based on the source information of the contents and the predetermined condition,
wherein the image post processing method is selected from among detail enhancement, color enhancement, noise reduction. blocking artifact reduction, ringing artifact reduction, definition enhancement, video deinterlacing, and frame rate conversion.

10. The image post-processor of claim 9, wherein the group classifier classifies elements to be post-processed as a first group and remaining elements as a second group based on source information of the contents and condition information stored in the storage, and the controller controls the image post-processor to post-process only the elements of the first group.

11. A method of displaying contents comprising:
determining an image post-processing method for elements of the contents based on source information of the contents received from a server and predetermined condition information;
post-processing the elements of the contents according to the determined image post-processing method after decoding of the contents; and
rendering the post-processed elements to generate the post-processed contents for a display, wherein at least one element of the contents is post-processed differently from at least one other element of the contents based on the source information,
wherein the image post processing method removes defects which occur in the decoding of the contents and is selectively applied to the elements of the contents such that the image post processing method is omitted for at least one element of the elements of the contents based on the source information of the contents and the predetermined condition,
wherein the image post processing method is selected from among detail enhancement, color enhancement, noise reduction, blocking artifact reduction, ringing artifact reduction, definition enhancement, video deinterlacing, and frame rate conversion.

12. The method of claim 11, further comprising displaying the generated contents,
wherein the predetermined condition information is information to distinguish elements to be post-processed from among elements of the contents,
wherein the determining comprises classifying the elements of the contents into at least two groups based on the source information of the contents and the predetermined condition information, and determining the image post-processing method to post-process elements of only one of the at least two groups.

13. The method of claim 12,
wherein the determining comprises classifying elements of the contents into a first group including elements to be post-processed and a second group including remaining elements based on the source information of the contents and the predetermined condition information,
wherein the first group comprises elements related to video image, and the second group comprises at least one of graphic rendering and text.

14. The method of claim 13, wherein the elements related to video image is at least one of Graphics Interchange Format (GIF) image, JPEG image, flash animation, and moving image.

15. The method of claim 13, wherein the determining comprises determining an image post-processing method for each element in a group including elements to be post-processed based on previously stored image post-processing methods corresponding to respective elements of the contents.

16. The method of claim 15, wherein the determining comprises determining an image post-processing method for elements including GIF image and JPEG image differently from an image post-processing method for elements including flash animation and moving image based on the image post-processing method stored in the storage.

17. The method of claim 15, wherein the image post-processing method comprises at least one of a detail enhancement, a color enhancement, a noise reduction, a blocking artifact reduction, a ringing artifact reduction, a definition enhancement, a video deinterlacing, and a frame rate conversion.

18. The method of claim 11, wherein the server is a web server, and the contents is a web page contents received from the web server.

19. A method of performing image post-processing comprising:
classifying elements of contents into at least two groups based on source information of the contents and condition information to distinguish elements to be post-processed from among elements of the contents;
determining an image post-processing method for each element of at least one of the two groups; and
performing image post-processing of an image corresponding to a respective element of the contents according to the determined image post-processing method after decoding of the contents,
wherein the image post processing method removes defects which occur in the decoding and is selectively applied to the elements of the contents such that the image post processing method is omitted for at least one element of the elements of the contents based on the source information of the contents and the predetermined condition, and
wherein the image post processing method is selected from among detail enhancement, color enhancement, noise reduction, blocking artifact reduction, ringing artifact reduction, definition enhancement, video deinterlacing, and frame rate conversion.

20. The method of claim 19, wherein the classifying comprises classifying elements of the contents into a first group including elements to be post-processed and a second group including remaining elements based on the source information of the contents and the pre-stored condition information, and wherein the performing the image post-processing comprises post-processing only the elements of the first group.

21. The display apparatus of claim 1, wherein each element of the contents represents an image or text to be displayed together, wherein the omitted at least one element comprises the text, and wherein at least one of elements of the contents are post-processed with at least two post-processing methods selected from among the detail enhancement, the color enhancement, the noise reduction, the blocking artifact reduction, the ringing artifact reduction, the definition enhancement, the video deinterlacing, and the frame rate conversion.

22. The display apparatus of claim 1, wherein:
a first element comprises at least one of an image or a video generated by the server and a second element comprises text or graphic rendering generated by the display apparatus,
the image post processing method is applied to the first element and not the second element, and
the image post processing method comprises the blocking artifact reduction and the ringing artifact reduction,
wherein the contents are rendered on a composite webpage with the first element and the second element being displayed together.

23. The display apparatus of claim 1, wherein:
a first element of the contents comprises at least one of a GIF or JPEG image and a second element of content comprises at least one of a flash animation and a moving image,
the first element is post-processed with at least two of the detail enhancement, the color enhancement, and the noise reduction and the second element is post-processed with at least one of the video deinterlacing and the frame rate conversion, and
wherein the post-processed first element and the post-processed second element are rendered together in a single website, and
wherein the post processing method removes defects introduced with the decoding of the contents.

* * * * *